Patented Mar. 17, 1925.

1,529,995

UNITED STATES PATENT OFFICE.

HERMANN FRITZSCHE, EMIL REBER, AND FRITZ STRAUB, OF BASEL, SWITZERLAND, ASSIGNORS TO THE SOCIETY OF CHEMICAL INDUSTRY IN BASLE, OF BASEL, SWITZERLAND.

COMPLEX CHROMIUM COMPOUNDS OF AZO DYESTUFFS.

No Drawing.    Application filed October 8, 1923. Serial No. 667,319.

*To all whom it may concern:*

Be it known that we, HERMANN FRITZSCHE, EMIL REBER, and FRITZ STRAUB, all citizens of the Swiss Republic, and residing at Basel, Switzerland, have invented new and useful Complex Chromium Compounds of Azo Dyestuffs, of which the following is a full, clear, and exact specification.

The present invention relates to new complex chromium compounds of azo dyestuffs which form valuable acid coloring matters for the production of fast tints on the animal fiber. It comprises the dyed fabrics or other materials, dyed with the new dyestuffs, as well as the dyestuffs themselves.

It has been found that new complex compounds of azo dyestuffs with chromium may be obtained by the action of chroming agents on the 0-hydroxyazo-dyestuffs, which are obtained by coupling 1-aryl-5-pyrazolones carrying an $SO_2NH_2$ group in their aryl nucleus with 0-hydroxydiazo compounds. Such a chroming agent is, for instance, the chromic oxide $Cr_2O_3$ or respectively its hydroxide $Cr(OH)_3$ or the combination of these bodies with alkalies or weak acids.

The new products are therefore the complex chromium compounds of azo dyestuffs of the general formula: R—N=N—R' wherein R signifies a 1-aryl-5-pyrazolone carrying an $SO_2NH_2$ group in its aryl nucleus, and R' an aryl nucleus containing an OH group in ortho-position to the azo bridge. They form dark powders having more or less a bronze reflection, soluble in water on addition of alkali to orange-red to blue-red solutions, dyeing wool in an acid bath orange to blue-red tints of excellent fastness to fulling and to light and of high purity. The following examples illustrate the invention without, however, limiting the same.

*Example 1.*

510 parts of the dyestuff obtained by coupling diazotized 2-amino-1-hydroxybenzene-4-chloro-5-sulfonic acid with 1-(3'-sulfamido)-phenyl-3-methyl-5-pryazolone are dissolved in 6000 parts of boiling water; a quantity of chromium fluoride corresponding with 243 parts of chromium oxide ($Cr_2O_3$) dissolved in about 5000 parts of water is then added and the mixture is heated in a reflux apparatus until the dyestuff is transformed into its chromium derivative. The liquid is evaporated in part and the dyestuff is precipitated by adding common salt. The new dyestuff is a brown powder which dissolves in alkaline water to an orange red solution and dyes wool very uniform orange-red tints, fast to washing and light.

*Example 2.*

525 parts of the dyestuff obtained by coupling the diazo compound of 1-amino-2-hydroxynapthalene-4-sulfonic acid with 1-(3'-sulfamido)-phenyl-3-methyl-5-pyrazolone are dissolved in 10,000 parts of boiling water and there is added a quantity of chromium formate corresponding with 228 parts of chromium oxide ($Cr_2O_3$); the mixture is heated in a reflux apparatus until the dyestuff has been transformed into its chromium derivative. The liquid is cooled and the chromed dyestuff, which has separated in the form of a crystalline powder having a bronze reflection, is filtered. It dissolves in alkaline water to a red solution and dyes wool in an acid bath beautiful, very pure rose tints which are very fast and of excellent uniformity.

By substituting for the chromium formate another chroming agent, such as the acetate, the fluoride or chromium oxide, products of like properties are obtained.

*Example 3.*

570 parts of the dyestuff obtained by coupling the nitrated diazo compound of 1-amino-2-hydroxynaphthalene-4-sulfonic acid with 1-(3'-sulfamido)-phenyl-3-methyl-5-pyrazolone are dissolved in about 7000 parts of boiling water and there is added a quantity of chromium fluoride corresponding with 228 parts of chromium oxide ($Cr_2O_3$); the whole is heated in a reflux apparatus until the dyestuff has been transformed into its chromium derivative. On cooling the dyestuff separates in the form of a crystalline powder having a bronze reflection. It dissolves in alkaline water to a red solution and dyes wool in an acid bath red tints, very fast and of excellent uniformity.

By substituting another chroming agent for chromium fluoride, an analogous product is obtained.

Example 4.

A mixture of 60 parts of chromium oxide ($Cr_2O_3$), in the form of freshly precipitated hydrate, 260 parts of caustic potash, 100 parts of glycerine and 420 parts of water is heated until the constituents have wholly dissolved; there are then added 2000 parts of water, 525 parts of the dyestuff obtained by coupling the diazo compound of 1-amino-2-hydroxynaphthalene-4-sulfonic acid with 1-(3'-sulfamido)-phenyl-3-methyl-5-pyrazolone and the whole is heated until nearly all the dyestuff has been transformed into the chromium derivative. The mixture is then diluted with 6000 parts of cold water, the excess of alkali is neutralized with acetic acid and the dyestuff is precipitated by adding common salt; it is filtered and dried.

What we claim is:

1. As new products the herein described complex chromium compounds of the azo dyestuffs of the general formula R—N=N—R' wherein R signifies a 1-aryl-5-pyrazolone carrying an $SO_2NH_2$ group in its aryl nucleus, and R' an aryl nucleus containing an OH— group in ortho-position to the azo bridge, which dyestuffs constitute dark powders having more or less a bronze reflection, dissolving in water on addition of alkali to orange-red to blue-red solutions, producing on wool dyed in an acid bath orange- to blue-red tints of high purity and excellent fastness to fulling and to light.

2. As new products the herein described complex chromium compounds of the azo dyestuffs of the general formula R—N=N—R' wherein R signifies a 1-aryl-5-pyrazolone carrying an $SO_2NH_2$ group in its aryl nucelus, and R' a mono-sulfonated aryl nucelus containing an OH— group in ortho-position to the azo bridge, which dyestuffs constitute dark powders having more or less a bronze reflection, dissolving in water on addition of alkali to orange-red to blue-red solutions, producing on wool dyed in an acid bath orange- to blue-red tints of high purity and excellent fastness to fulling and to light.

3. As new products the herein described complex chromium compounds of the azo dyestuffs of the general formula R—N=N—R' wherein R signifies a 1-aryl-3-methyl-5-pyrazolone carrying an $SO_2NH_2$ group in its aryl nucleus, and R' a monosulfonated aryl nucleus containing an OH— group in ortho-position to the azo bridge, which dyestuffs constitute dark powders having more or less a bronze reflection, dissolving in water on addition of alkali to orange-red to blue-red solutions, producing on wool dyed in an acid bath orange- to blue-red tints of high purity and excellent fastness to fulling and to light.

4. As new products the herein described complex chromium compounds of the azo dyestuffs of the general formula R—N=N—R' wherein R signifies a 1-aryl-3-methyl-5-pyrazolone carrying an $SO_2NH_2$ group in its aryl nucleus, and R' a 2-hydroxynaphthalene-4-sulfonic acid nucleus where the azo bridge adheres to the 1-position of the naphthalene nucleus, which dyestuffs constitute dark powders having more or less a bronze reflection, soluble in water on addition of alkali to red to blue-red solutions, producing on wool dyed in an acid bath red to blue-red tints of high purity and excellent fastness to fulling and to light.

5. As new products the herein described complex chromium compounds of the azo dyestuffs of the general formula R—N=N—R' wherein R signifies a 1-(3'sulfamido)-aryl-3-methyl-5-pyrazolone, and R' a 2-hydroxynaphthalene-4-sulfonic acid nucleus where the azo bridge adheres to the 1-position of the naphthalene nucleus, which dyestuffs constitute dark powders having more or less a bronze reflection, soluble in water on addition of alkali to red to blue-red solutions, producing on wool dyed in an acid bath red to blue-red tints of high purity and excellent fastness to fulling and to light.

6. As new products the herein described complex chromium compounds of the dyestuff of the general formula

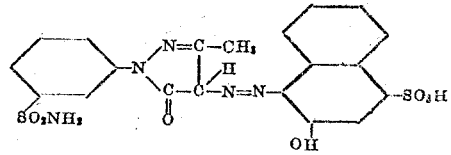

which constitute dark powders having a bronze reflection, soluble in water on addition of alkali to blue-red solutions, producing on wool dyed in an acid bath blue-red tints of high purity and excellent fastness to fulling and to light.

7. Materials dyed with the new dyestuffs of claim 1.

8. Materials dyed with the new dyestuffs of claim 2.

9. Materials dyed with the new dyestuffs of claim 3.

10. Materials dyed with the new dyestuffs of claim 4.

11. Materials dyed with the new dyestuffs of claim 5.

12. Materials dyed with the new dyestuffs of claim 6.

In witness whereof we have hereunto signed our names this 27th day of September, 1923, in the presence of two subscribing witnesses.

HERMANN FRITZSCHE.
EMIL REBER.
FRITZ STRAUB.

Witnesses:
AMAND BRAUN,
JOSEPH SÜTTERLIN.